(12) United States Patent
Saini et al.

(10) Patent No.: US 12,423,097 B2
(45) Date of Patent: Sep. 23, 2025

(54) SIGNIFICAND SHIFTING IN FLOATING POINT PROCESSING OPERATIONS

(71) Applicant: Arm Limited, Cambridge (GB)

(72) Inventors: Anisha Saini, Austin, TX (US); Mairin Imro Kroes, Letchworth Garden City (GB); Thomas Elmer, Austin, TX (US); Neil Burgess, Cardiff (GB)

(73) Assignee: Arm Limited, Cambridge (GB)

( * ) Notice: Subject to any disclaimer, the term of this patent is extended or adjusted under 35 U.S.C. 154(b) by 50 days.

(21) Appl. No.: 18/428,137

(22) Filed: Jan. 31, 2024

(65) Prior Publication Data

US 2025/0245004 A1 Jul. 31, 2025

(51) Int. Cl.
*G06F 9/30* (2018.01)

(52) U.S. Cl.
CPC ........ *G06F 9/3001* (2013.01); *G06F 9/30032* (2013.01); *G06F 9/30145* (2013.01)

(58) Field of Classification Search
None
See application file for complete search history.

(56) References Cited

U.S. PATENT DOCUMENTS

| 10,459,688 | B1 * | 10/2019 | Burgess | H03M 7/24 |
| 2012/0011181 | A1 * | 1/2012 | Samy | G06F 7/483 |
| | | | | 708/204 |
| 2015/0142864 | A1 * | 5/2015 | Quinnell | G06F 7/50 |
| | | | | 708/505 |
| 2016/0126975 | A1 * | 5/2016 | Lutz | G06F 9/30014 |
| | | | | 708/204 |
| 2017/0090868 | A1 * | 3/2017 | Lutz | G06F 7/487 |
| 2017/0102939 | A1 | 4/2017 | Lutz et al. | |
| 2018/0217815 | A1 * | 8/2018 | Hinds | G06F 17/16 |

OTHER PUBLICATIONS

Muller, Jean-Michel et al., Handbook of Floating point Arithmetic, 2018, Springer Intl. Pub., 627 pages. (Year: 2018).*
U.S. Appl. No. 18/428,446, filed Jan. 31, 2024, Kroes et al.
U.S. Appl. No. 18/428,115, filed Jan. 31, 2024, Lutz et al.
Anthony M. Castaldo et al., "Reducing Floating Point Error in Dot Product Using the Superblock Family of Algorithms", Siam J. SciI. Comput., vol. 31, No. 2, Dec. 2008, pp. 1156-1174.

(Continued)

*Primary Examiner* — Eric Coleman
(74) *Attorney, Agent, or Firm* — NIXON & VANDERHYE P.C.

(57) ABSTRACT

Apparatuses, methods, computer readable media, and systems are disclosed in which a floating point processing instruction is decoded to generate control signals to trigger a floating point processing operation. In response to the control signals, the floating point processing operation is performed, comprising: performing processing that yields more than two floating point values; and performing, for each of the more than two floating point values: a determination of a shift value for a significand of that floating point value by subtracting an exponent value for that floating point value from a predetermined constant anchor value determined based on a maximum calculable product exponent for a product of the more than two floating point operands, and a shift of the significand by the shift value determined for that floating point value.

19 Claims, 7 Drawing Sheets

(56) References Cited

OTHER PUBLICATIONS

Oégane Desrentes et al., "Exact Dot Product Accumulate Operators for 8-bit Floating-Point Deep Learning", DSD/SEAA 2023—26th Euromicro Conference Series on Digital System Design, Sep. 2023, Durres, Albania, HAL open science, HAL id: hal-04240816, 9 pages, at URL: https://inria.hal.science/hal-04240816.

Himanshu Kaul et al., "Optimized Fused Floating-Point Many-Term Dot-Product Hardware for Machine Learning Accelerators", 2019 IEEE 26th Symposium on Computer Arithmetic (ARITH), IEEE Computer Society, downloaded on Nov. 24, 2023, 4 pages.

Search Report for GB Application No. 2418509.2 dated May 30, 2025, 4 pages.

\* cited by examiner

SIGNIFICAND SHIFTING IN FLOATING POINT PROCESSING OPERATIONS

TECHNICAL FIELD

The present disclosure relates to data processing. In particular, the present disclosure relates to the performance of floating point processing operations.

DESCRIPTION

A data processing apparatus that is responsive to data processing instructions to perform data processing operations may be configured to handle some data values in floating point format and be responsive to corresponding floating point instructions to manipulate such floating point values. Such floating point operations may be single mathematical steps, e.g. to multiply or to add two floating point values, but coding and processing efficiency may be gained by combining multiple operations to be initiated by a single floating point instruction, such as a fused multiply-add operation or a fused multiply-accumulate operation. Moreover, support for such operations may be provided whereby more than two floating point values are handled in the data processing operations performed, thus requiring an addition of more than two floating point values to be performed. In order to correctly align the more than two floating point values for the addition, this can then require multiple exponent values to be compared, which can in turn incur significant overhead in the apparatus design in terms of area, latency, and power.

SUMMARY

One example embodiment disclosed herein is an apparatus comprising:
  decoder circuitry responsive to a floating point processing instruction to generate control signals to trigger a floating point processing operation; and processing circuitry responsive to the control signals to perform the floating point processing operation, the floating point processing operation comprising: performing processing that yields more than two floating point values; and performing, for each of the more than two floating point values:
  a determination of a shift value for a significand of that floating point value by subtracting an exponent value for that floating point value from a predetermined constant anchor value, wherein the predetermined constant anchor value is determined based on a maximum calculable product exponent for a product of the more than two floating point operands; and a shift of the significand by the shift value determined for that floating point value.

Another example embodiment disclosed herein is non-transitory computer-readable medium on which is stored computer-readable code for fabrication of the apparatus of the above mentioned example embodiment.

Another example embodiment disclosed herein is a method of data processing comprising:
  decoding a floating point processing instruction specifying a floating point processing operation;
  generating control signals to trigger the floating point processing operation; and
  performing the floating point processing operation in response to the control signals, the floating point processing operation comprising:
  performing processing that yields more than two floating point values; and
  performing, for each of the more than two floating point values:
  a determination of a shift value for a significand of that floating point value by subtracting an exponent value for that floating point value from a predetermined constant anchor value, wherein the predetermined constant anchor value is determined based on a maximum calculable product exponent for a product of the more than two floating point operands; and
  a shift of the significand by the shift value determined for that floating point value.

Another example embodiment disclosed herein is a system comprising:
  the apparatus of the above mentioned example embodiment, implemented in at least one packaged chip;
  at least one system component; and
  a board,
  wherein the at least one packaged chip and the at least one system component are assembled on the board.

Another example embodiment disclosed herein is a chip-containing product comprising the system of the above mentioned example embodiment assembled on a further board with at least one other product component.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
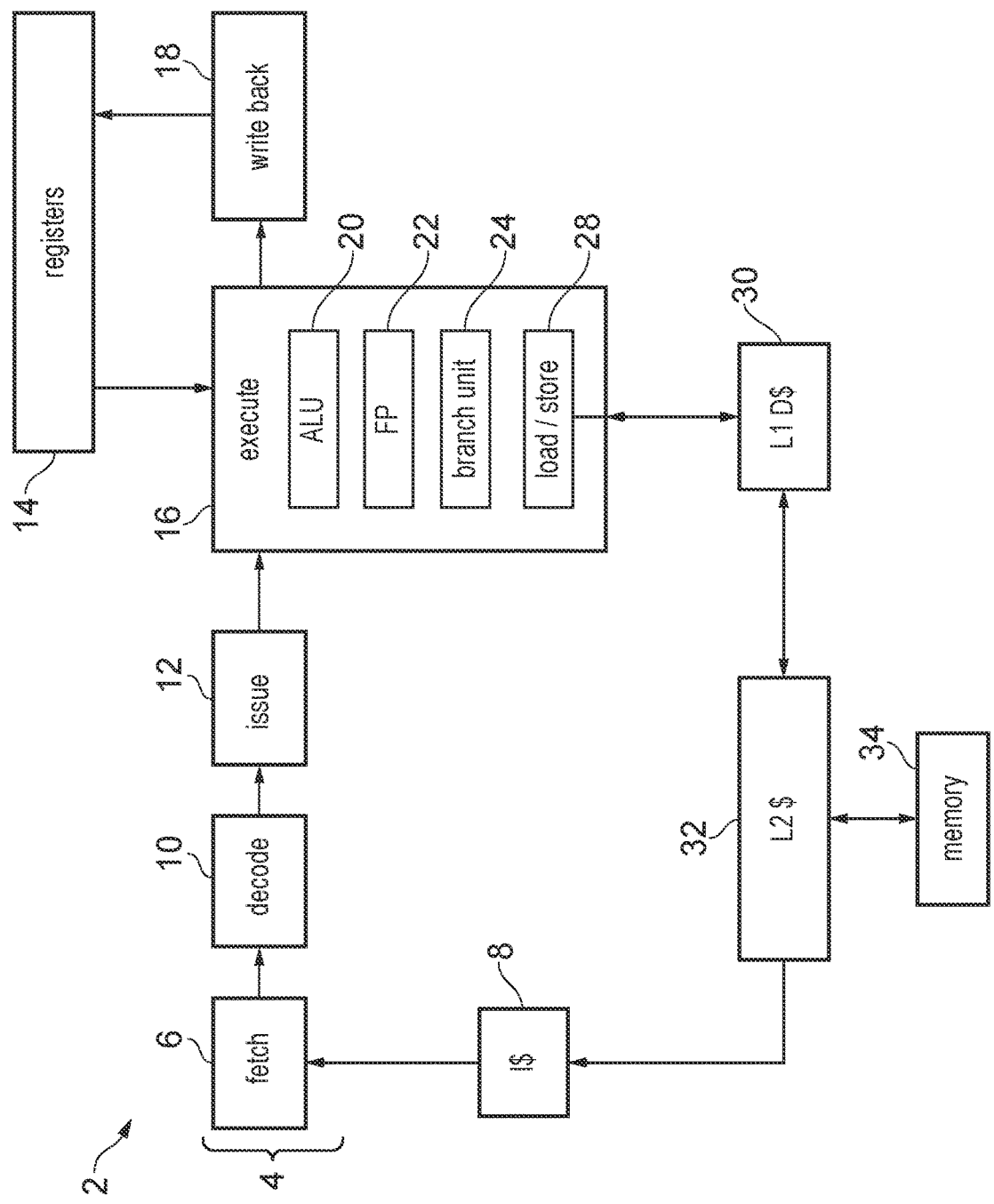
FIG. 1 schematically illustrates a data processing apparatus having an instruction execution pipeline which can embody the present techniques in accordance with some examples.

Before discussing the embodiments with reference to the accompanying figures, the following description of embodiments is provided.

In accordance with one example configuration there is provided an apparatus comprising:
  decoder circuitry responsive to a floating point processing instruction to generate control signals to trigger a floating point processing operation; and processing circuitry responsive to the control signals to perform the floating point processing operation, the floating point processing operation comprising:

performing processing that yields more than two floating point values; and performing, for each of the more than two floating point values:

a determination of a shift value for a significand of that floating point value by subtracting an exponent value for that floating point value from a predetermined constant anchor value, wherein the predetermined constant anchor value is determined based on a maximum calculable product exponent for a product of the more than two floating point operands; and a shift of the significand by the shift value determined for that floating point value.

In an apparatus that is responsive to floating point processing instructions to perform floating point processing operations, when multiple floating point values need alignment (e.g. as part of a summation of those floating point data values), typically the values are aligned with respect to the largest exponent of those floating point data values. This approach is well suited for two floating point data values, whereby the value with smaller magnitude (i.e. with the smaller exponent) is shifted to align it with the value with larger magnitude (i.e. with the larger exponent). However, the alignment of more than two floating point values is more complex, for example an accumulating 2-way DOT product (i.e. comprising a three addend summation) requires three magnitude comparisons to be carried out, as well as additional circuitry to select the required shift distances for each of the three addends from the six possible permutations of their relative magnitudes. Indeed generally, there are n! permutations of the relative magnitudes of n addends, hence requiring significantly more such additional circuitry as the number of addends increases. For example a 4-way DOT product requires 9 or 10 magnitude comparisons to be carried out to establish the size ordering of the products. In this context, the inventors of the present techniques have realised that an improved approach to the alignment of multiple floating point values can be provided by determining the required shift for the significand of each floating point value by subtracting that floating point value's exponent value from a predetermined constant "anchor" value, where the predetermined constant anchor value is determined based on a maximum calculable product exponent for a product of the more than two floating point operands. Although predetermined and constant, the anchor value may be selected in a variety of ways taking into account the requirements of the floating point processing operation being carried out and the number of floating point values involved.

The floating point processing instruction and the corresponding floating point processing operation may take a variety of forms, but in some examples the floating point processing instruction is a dot product instruction and the floating point processing operation is a dot product operation.

In some examples, the floating point processing operation comprises an accumulation and the floating point processing instruction identifies an accumulation source from which a prior accumulation value is to be retrieved and into which an accumulation result of the floating point processing operation is to be accumulated.

When the floating point processing operation is an accumulating dot product operation the number of pairs of input floating point operands can take a range of values and the present techniques are not limited to a particular number of pairs of input floating point operands. In some examples, the dot product operation is a two-input dot product operation and the floating point processing instruction identifies two pairs of input floating point operands and the accumulation source. In some examples, the dot product operation is a four-input dot product operation and the floating point processing instruction identifies four pairs of input floating point operands and the accumulation source.

In some examples the predetermined constant anchor value is determined by a summation of the maximum calculable product exponent with a characteristic multiplicity factor dependent on a multiplicity of the more than two floating point values.

In some examples the characteristic multiplicity factor is determined as a ceiling value of a base-2 logarithm of the multiplicity of the more than two floating point values.

In some examples the dot product operation is a two-input or a four-input dot product operation and the floating point processing instruction identifies two pairs or four pairs of input floating point operands and the accumulation source, wherein the multiplicity of the more than two floating point values is given by a multiplicity of addends in the two-input dot product operation or the four-input dot product operation.

In some examples the summation further comprises an increment value. In some examples the increment value is 1.

In some examples the floating point processing instruction further specifies a scaling factor and the determination of the shift value for the prior accumulation value further comprises subtracting the scaling factor from the predetermined constant anchor value.

In some examples the floating point processing instruction further specifies a scaling factor and the determination of the shift value for the prior accumulation value further comprises adding the scaling factor to the predetermined constant anchor value.

In some examples a direction of the shift of the significand for the prior accumulation value is determined by a sign of the shift value and wherein the shift of the significand for the more than two floating point values is a right shift.

In some examples a first floating point format of the prior accumulation value differs from a second floating point format for the input floating point operands in that the first floating point format encompasses all precise encodings of the second floating point format, and wherein the shift of the significand for the prior accumulation value is a right shift and the shift of the significand for others of the more than two floating point values is a right shift.

In some examples the first floating point format comprises 16 bits and the second floating point format comprises 8 bits.

In accordance with one example configuration there is provided a non-transitory computer-readable medium on which is stored computer-readable code for fabrication of any of the above described examples of the apparatus.

In accordance with one example configuration there is provided a method of data processing comprising:

decoding a floating point processing instruction specifying a floating point processing operation;

generating control signals to trigger the floating point processing operation; and performing the floating point processing operation in response to the control signals, the floating point processing operation comprising:

performing processing that yields more than two floating point values; and performing, for each of the more than two floating point values:

a determination of a shift value for a significand of that floating point value by subtracting an exponent value for that floating point value from a predetermined constant anchor value, wherein the predetermined constant anchor value is determined based on a maximum calculable product exponent for a product of the more than two floating point operands; and a shift of the significand by the shift value determined for that floating point value.

In accordance with one example configuration there is provided a system comprising:

any of the above described examples of the apparatus, implemented in at least one packaged chip;

at least one system component; and a board, wherein the at least one packaged chip and the at least one system component are assembled on the board.

In accordance with one example configuration there is provided a chip-containing product comprising the above described example of the system assembled on a further board with at least one other product component.

Particular embodiments will now be described with reference to the figures.

FIG. 1 illustrates a data processing apparatus 2 in accordance with one example embodiment. The apparatus 2 has a processing pipeline 4 that includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor an additional register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. In the example shown, the execution units include an arithmetic/logic unit (ALU) 20 for performing arithmetic or logical operations; a floating-point unit 22 for performing operations on floating-point values; a branch unit 24 for evaluating the outcome of branch operations and adjusting the program counter which represents the current point of execution accordingly; and a load/store unit 28 for performing load/store operations to access data in a memory system 8, 30, 32, 34. In this example, the memory system includes a level one data cache (L1D$) 30, a level one instruction cache (L1I$) 8, a shared level two cache (L2$) 32, and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

Figure 2:
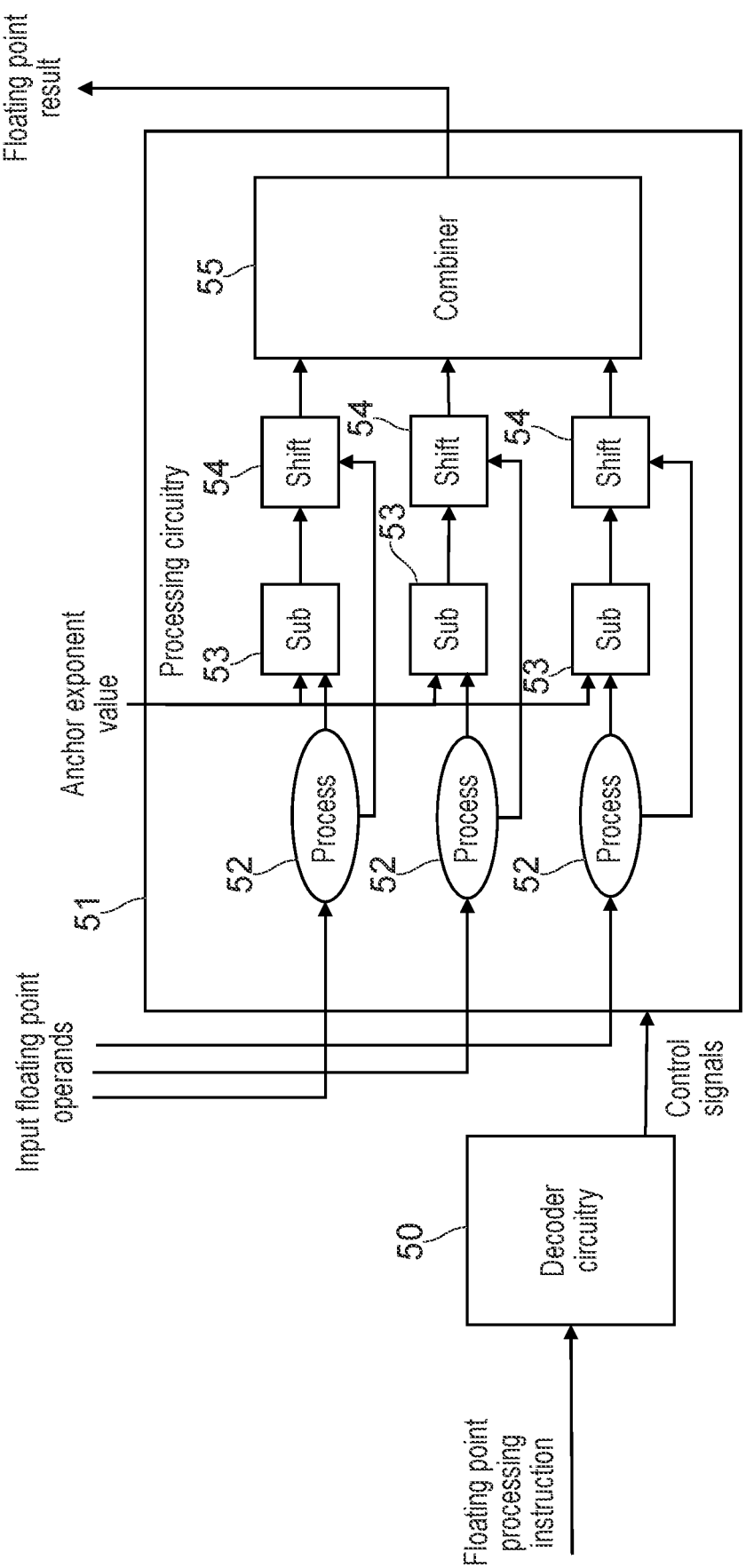
FIG. 2 schematically illustrates in more detail the decoder circuitry and processing circuitry of a data processing apparatus in accordance with some examples.

FIG. 2 schematically illustrates in more detail the decoder circuitry and processing circuitry of a data processing apparatus in accordance with some examples. As part of an instruction execution pipeline, such as that shown in FIG. 1, FIG. 2 shows decoder circuitry 50 that is arranged to receive a sequence of instructions and amongst these (as illustrated) it receives a floating point processing instruction, which it decodes and generates corresponding control signals to direct the operation of the processing circuitry 51. Within the processing circuitry 51 there is shown schematically a specific set of components of relevance to the present techniques. A first set of components 52 perform a variety of processing on the respective input floating point operands that they respectively receive (as dictated by the floating point processing instruction), each generating a floating point value. The following components of the processing circuitry are configured to bring those generated floating point values together into a combined floating point result. The first stage of this combination process is performed by the set of subtraction circuitry 53, which receives the exponent part of the respective floating point value and subtracts this exponent of each respective floating point value from a provided predetermined "anchor" value. The next stage of this combination process is performed by the set of shift circuitry 54, which receives the significand part of the respective floating point value and applies a shift to the significand, where the magnitude of this shift is determined by the subtraction result of the respective subtraction circuitry 53. This aligns the three floating point values, such that when their significands are subsequently passed to the combiner circuitry 55, they can be easily combined, e.g. summed, for output. The alignment with respect to the predetermined anchor value avoids the need for each floating point value to be compared with each other floating point value, and the combinatorial complexities that entails.

Figure 3:
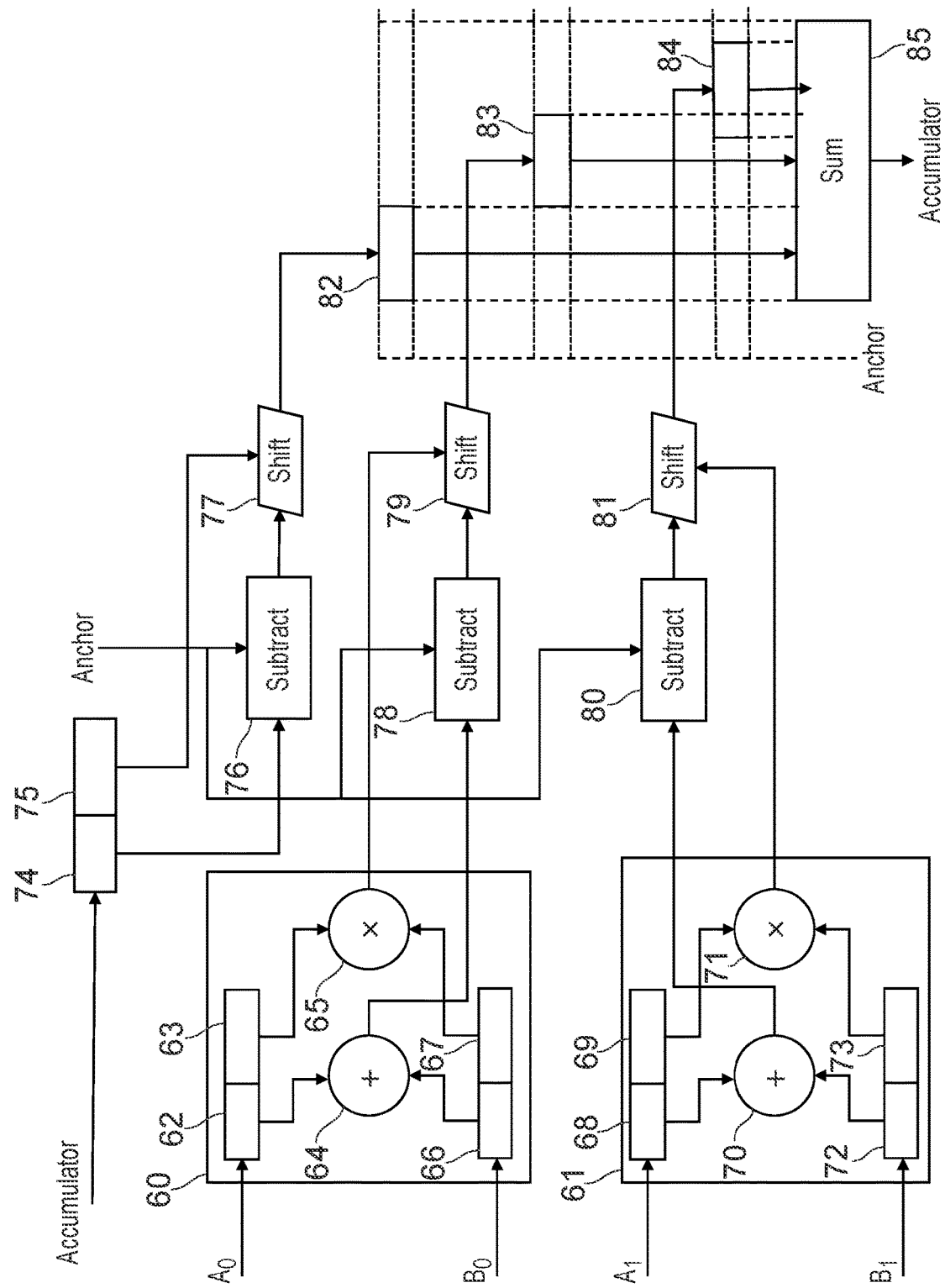
FIG. 3 schematically illustrates processing circuitry arranges to perform a two-input dot product and the accumulate operation in accordance with some examples.

FIG. 3 schematically illustrates processing circuitry arranges to perform a two-input dot product and the accumulate operation in accordance with some examples. This processing circuitry comprises two units 60, 61 comprising multiplication and addition circuitry that are configured to receive two pairs of floating point input values ($A_0$, $B_0$) and ($A_1$, $B_1$). The multiplication and addition units 60, 61 respectively comprise addition circuitry 64, 70 and multiplication circuitry 65, 71. Accordingly, for each pair of floating point input values the addition circuitry sums the exponent parts of the value pair, i.e. 62, 66 for ($A_0$, $B_0$) and 68, 72 for ($A_1$, $B_1$). Meanwhile, for each pair of floating point input values the multiplication circuitry multiplies the significand parts of the value pair, i.e. 63, 67 for ($A_0$, $B_0$) and 69, 73 for ($A_1$, $B_1$). Thus two floating point multiplies are performed. The circuitry shown in FIG. 3 further performs an accumulate operation with these two results, taking an existing accumulation value (itself having exponent part 74 and significand part 75), combining (summing) that prior accumulation value with the respective results of the two floating point multiplies which are performed by the multiply units 60, 61. This combined result is then returned to update the accumulation source from which the prior accumulation value 74, 75 was taken. This combination of the three floating point values is, in accordance with the present techniques, performed making use of a predetermined anchor value, from which the respective exponent value of each of the three floating point values is subtracted. The subtraction is performed by the set of subtraction circuitry 76, 78, 80 and the result of each subtraction controls the shift applied by a respective shifter of the set of shift circuitry 77, 79, 81 to the respective significand part of the three floating point values. The right-hand part of the figure illustrates the alignment of the resulting three shifted floating point values 82, 83, 84 (and the relative size of the anchor value) which are then summed by summation circuitry 85.

The fixed value of the predetermined anchor value can be set in a number of ways, although the present techniques particularly recognise that the anchor value should be sized to allow for the maximum possible exponent value from the floating point processing being performed. This will primarily depend on the particular floating point format being handled, for example in "half precision" (FP16) format, 5 bits are allocated to the exponent (with 10 bits for the significand and 1 for the sign), meaning that the maximum exponent value is $2^5-1=31$. Thus a straightforward determination of the predetermined anchor value is provided by this maximum exponent value. However, the present techniques further recognise that in the context of some floating point operations it may be beneficial to use a predetermined anchor value which allows for a slightly larger resulting floating point value, namely whereby in addition to the maximum exponent value, allowance is made for one or more carries which may result from the additions being performed. For example in the context of a DOT2 (two-way dot product), where one addition is performed, one carry is possible and thus the anchor value can be sized+1 to allow for this. Similarly in the context of a DOT4 (four-way dot product), where four addends are summed, $\log_2 (4)$ carries are possible and thus the anchor value can be sized+2 to allow for this. Generally, where N is the number of addends, there are $\log_2 N$ carries possible. Allowing for all integer values of N, the anchor value can be sized as the maximum exponent value+ceil ($\log_2 N$). Finally, where some examples involve an accumulation value, consideration of mass cancellation suggests that the predetermined anchor value optimally be determined as the maximum exponent value+ceil (log 2 N)+1. This anchor value optimally enables correct calculation of leading sign digits in the final sum as will be explained.

Figure 4:
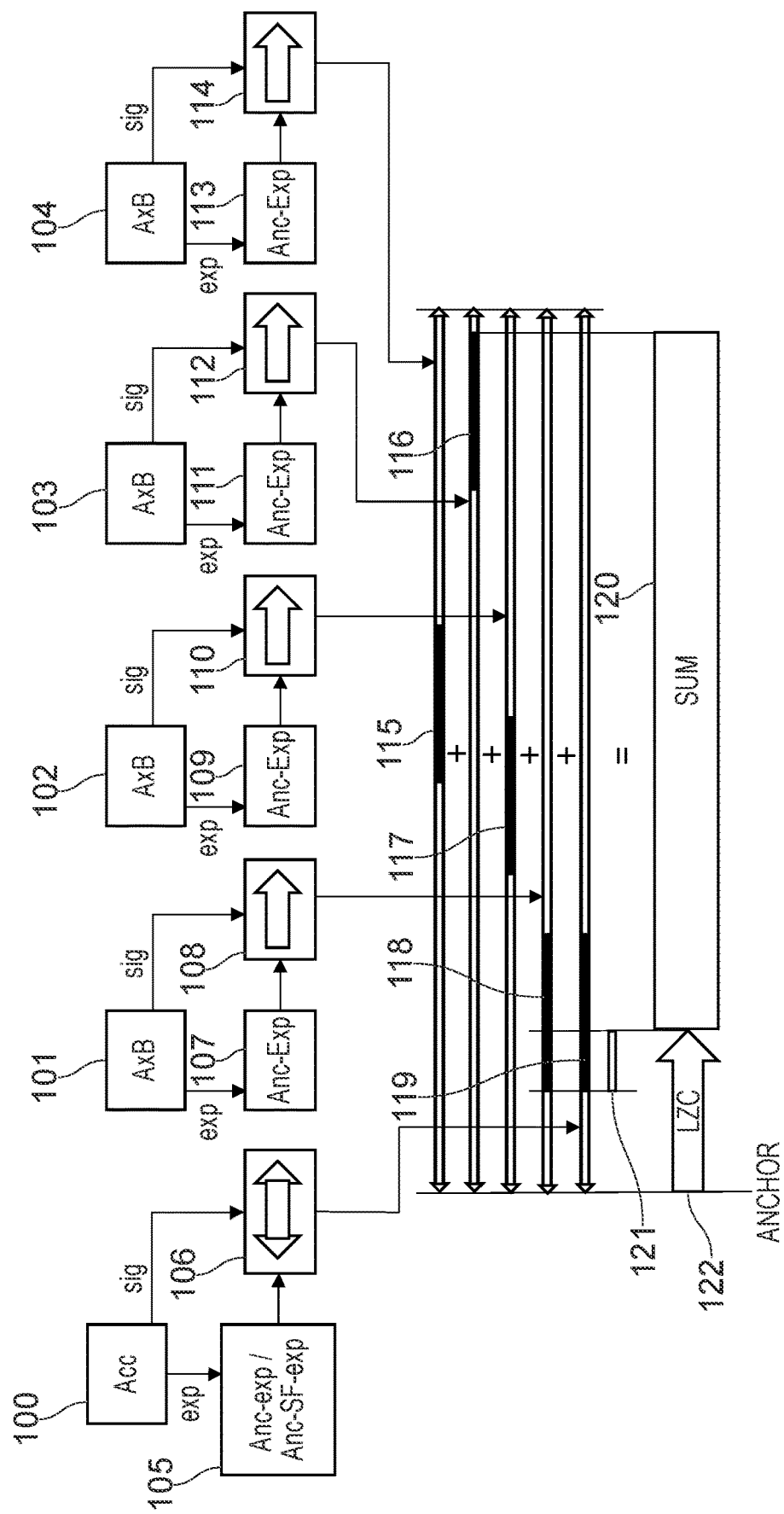
FIG. 4 schematically illustrates the alignment of the significands of four product values and an accumulate value using an anchor value in accordance with some examples.

FIG. 4 schematically illustrates the alignment of the significands of four product values and an accumulation value using an anchor value in accordance with some examples. This represents an accumulating DOT4 calculation. The four product values are the respective results of four pairs of floating point input values being multiplied together in their pairs, shown by the four sets of multiplication circuitry "A×B" 101, 102, 103, 104. These four multiplications each yield an exponent part ("exp") and a significand part ("sig"). In each case, the exponent part is passed to respective subtraction circuitry 107, 109, 111, 113, which subtracts the respective exponent from the predetermined anchor value ("Anc"). The respective results of these subtractions are passed to respective right shift circuitry 108, 110, 112, 114, which steers the number of bit positions by which the corresponding significand is right-shifted. Similarly, an accumulation value 100 also forms part of the summation here, and there is provided subtraction circuitry 105, which, in a first alternative shown, subtracts the accumulation value's exponent from the predetermined anchor value ("Anc"). An alternative is also shown, wherein the subtraction circuitry 105 subtracts both a scaling factor ("SF") and the accumulation value's exponent from the predetermined anchor value ("Anc"). This scaling factor can be provided by the floating point processing instruction that triggers the operations shown in FIG. 4. The use of such a scaling factor may for example be useful when using a floating point format (such as FP8) with a relatively limited dynamic range of representation. Applying the scaling factor to the accumulation value's exponent subtraction expedites the inclusion of the scaling factor into the summation. The result of the accumulation value's exponent subtraction 105 is passed to the shift circuitry 106, which steers the number of bit positions by which the accumulation value's significand is shifted and the direction of that shift. It will be noted therefore that in the case of the accumulation value the required shift may, generally, be a left-shift or a right-shift. An example of the relative magnitudes of the shifted significands 115, 116, 117, 118, 119 is visually shown in the lower part of FIG. 4. These are then summed, resulting in the summation 120. Note that in the example of FIG. 4, in calculating the summation of the shifted significands 118 and 119 there is a mass cancellation 121, whereby each loses a set of most significant bits. The normalisation of the summation value 120 is controlled by the leading zero count (LZC) 122 with respect to the anchor value, allowing for this mass cancellation. In the case where the accumulation exponent is greater than the anchor value as determined by the provided equation such a mass cancellation is not possible and the leading zero determination logic can then be simplified. Latency of the calculation can then be reduced by early identification of those calculations that can/can't mass cancel.

Figure 5:
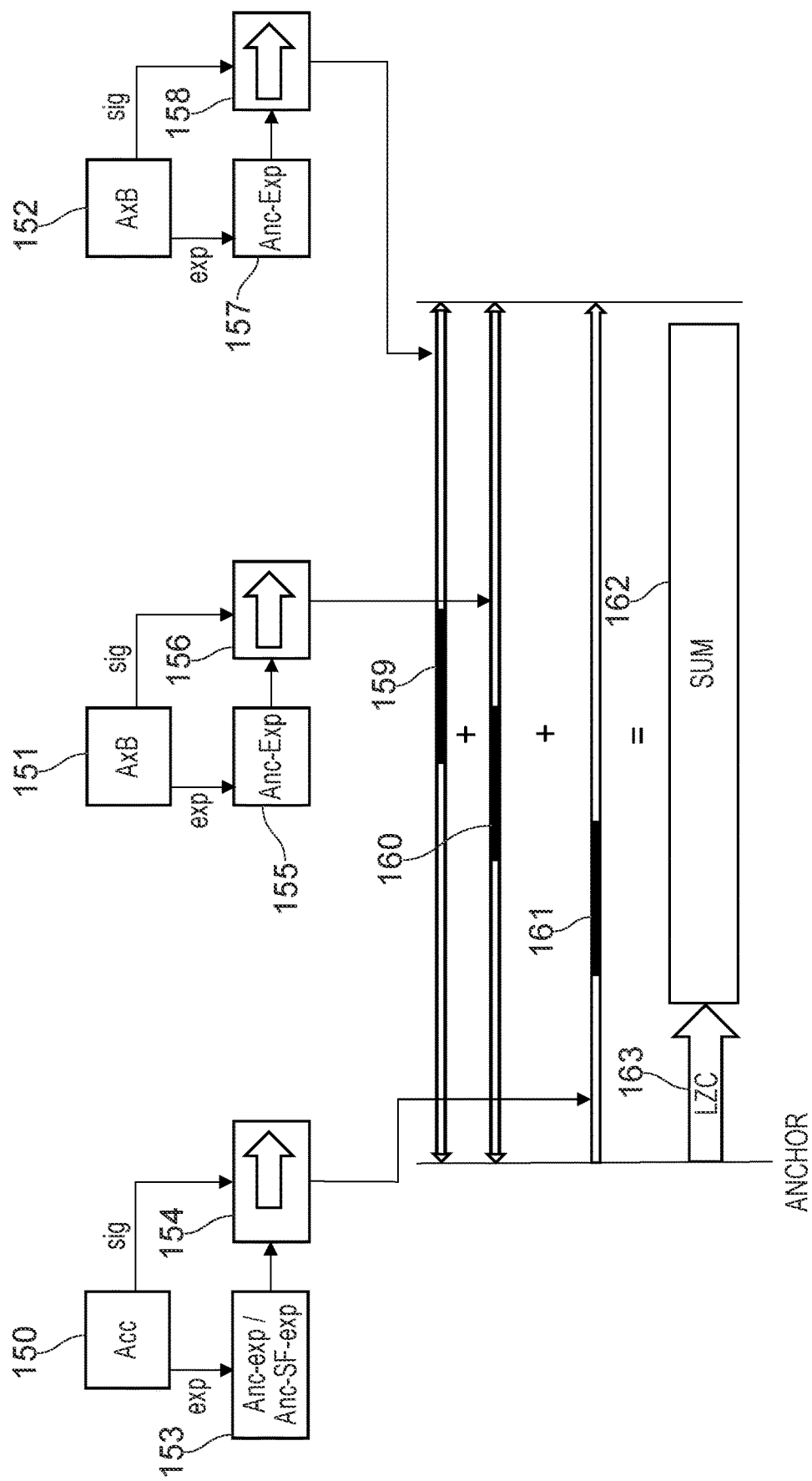
FIG. 5 schematically illustrates the alignment of the significands of two product values and an accumulate value using an anchor value in accordance with some examples.

FIG. 5 schematically illustrates the alignment of the significands of two product values and an accumulation value using an anchor value in accordance with some examples. This represents an accumulating DOT2 calculation. The two product values are the respective results of two pairs of floating point input values being multiplied together in their pairs, shown by the two sets of multiplication circuitry "A×B" 151, 152. These two multiplications each yield an exponent part ("exp") and a significand part ("sig"). In each case, the exponent part is passed to respective subtraction circuitry 155, 157, which subtracts the respective exponent from the predetermined anchor value ("Anc"). The respective results of these subtractions are passed to respective right shift circuitry 156, 158, which steer the number of bit positions by which the corresponding significand is right-shifted. Similarly, an accumulation value 150 also forms part of the summation here, and there is provided subtraction circuitry 153, which, in a first alternative shown, subtracts the accumulation value's exponent from the fixed anchor exponent value ("Anc"). The alternative discussed above with reference to FIG. 4 is also shown, namely wherein the subtraction circuitry 153 subtracts both a scaling factor ("SF") and the accumulation value's exponent from the predetermined anchor value ("Anc"). The result of the accumulation value's exponent subtraction 153 is passed to the right-shift circuitry 154, which steers the number of bit positions by which the accumulation value's significand is right-shifted. It will be noted therefore that in this case of shifting the accumulation value's significand the required shift can only be a right-shift. This results from the fact that, in this example, the floating point format of the accumulation value is different to that of the input floating point values (to the product calculations 151 and 152). Specifically in this example shown the input floating point values are in FP8 format, whilst the accumulation value is in FP16 format. In this configuration, it is not possible for the accumulation exponent to exceed that of the predetermined anchor value, and therefore it will only ever be a right-shift of the accumulation value significand that is required. The accumulation value significand shifting circuitry 154 can thus be provided by a simpler arrangement of circuitry than that of the significand shifting circuitry 106 in FIG. 4. Of course, other differing pairs of floating point formats may also be implement to the same effect. An example of the relative magnitudes of the shifted significands 159, 160 is visually shown in the lower part of FIG. 5. These are then summed, resulting in the summation 162. The normalisation of the summation value 162 is controlled by the leading zero count (LZC) 163 with respect to the anchor value.

Figure 6:
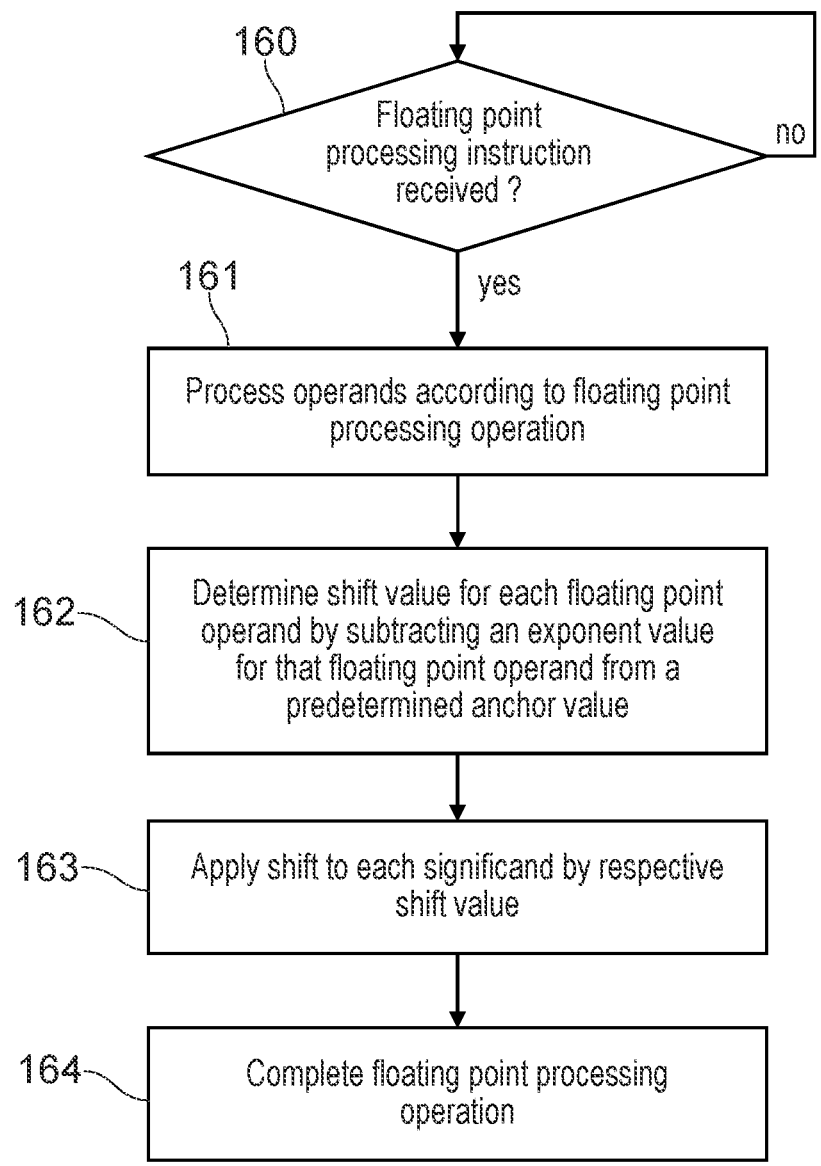
FIG. 6 is a flow diagram showing a sequence of steps which are carried out in accordance with the method of some examples.

FIG. 6 is a flow diagram showing a sequence of steps which are carried out in accordance with the method of some examples. The start of the method is step 160, where the flow loops on itself until a floating point processing instruction is received. Then at step 161, the operands specified by the floating point processing instruction are processed according to floating point processing operation defined by the floating point processing instruction. Then at step 162, a shift value is determined for each floating point operand by subtracting an exponent value for that floating point operand from a predetermined anchor value. At step 163, a shift is applied to each significand by the respective shift value. Then at step 164 the floating point processing operation is completed.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 7:
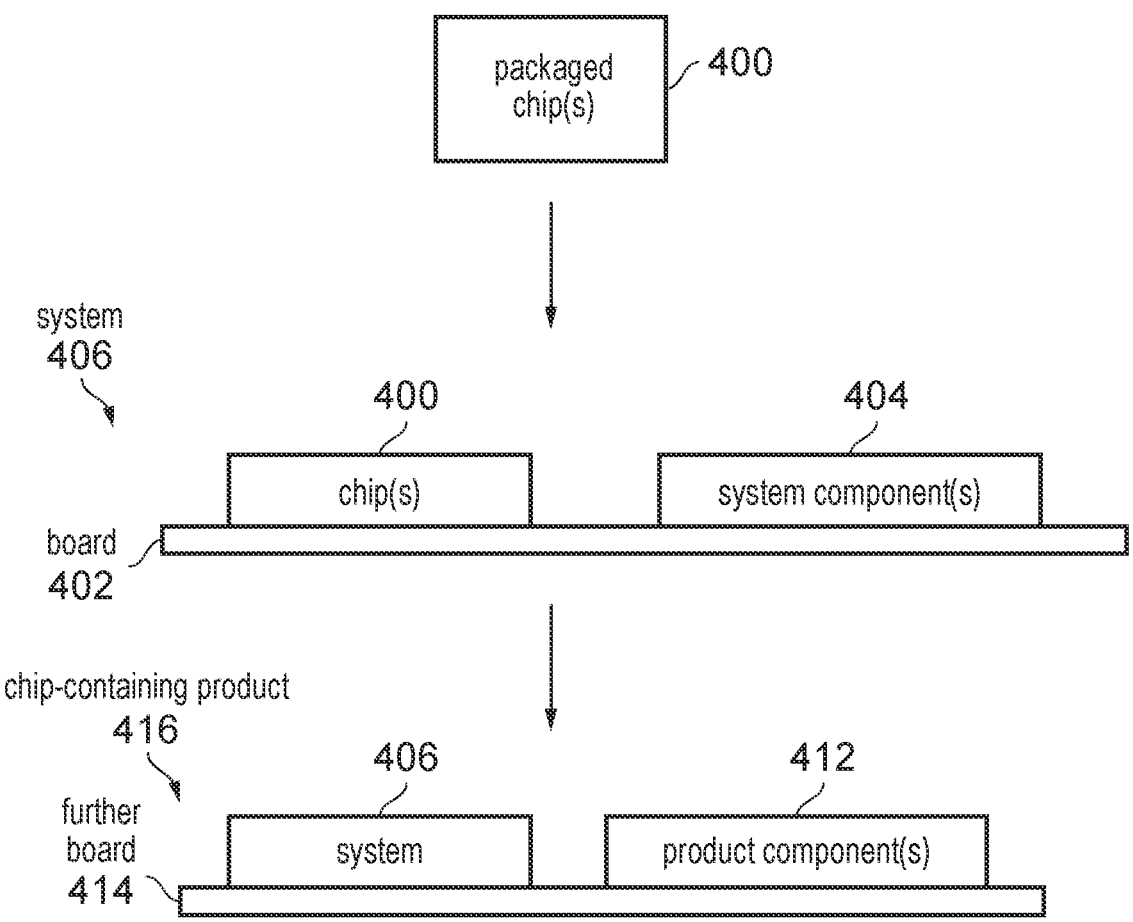
FIG. 7 schematically illustrates a system and a chip containing product according to some example configurations.

As shown in FIG. 7, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components, which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company. The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions that are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Various examples of the present techniques are set forth in the following numbered Clauses:

Clause 1. Apparatus comprising:
  decoder circuitry responsive to a floating point processing instruction to generate control signals to trigger a floating point processing operation; and
  processing circuitry responsive to the control signals to perform the floating point processing operation, the floating point processing operation comprising:
  performing processing that yields more than two floating point values; and
  performing, for each of the more than two floating point values:
    a determination of a shift value for a significand of that floating point value by subtracting an exponent value for that floating point value from a predetermined constant anchor value, wherein the predetermined constant anchor value is determined based on a maximum calculable product exponent for a product of the more than two floating point operands; and
    a shift of the significand by the shift value determined for that floating point value.

Clause 2. The apparatus as defined in Clause 1, wherein the floating point processing instruction is a dot product instruction and the floating point processing operation is a dot product operation.

Clause 3. The apparatus as defined in Clause 1 or Clause 2, wherein the floating point processing operation comprises an accumulation and the floating point processing instruction identifies an accumulation source from which a prior accumulation value is to be retrieved and into which an accumulation result of the floating point processing operation is to be accumulated.

Clause 4. The apparatus as defined in Clause 3, wherein the dot product operation is a two-input dot product operation and the floating point processing instruction identifies two pairs of input floating point operands and the accumulation source.

Clause 5. The apparatus as defined in Clause 3, wherein the dot product operation is a four-input dot product operation and the floating point processing instruction identifies four pairs of input floating point operands and the accumulation source.

Clause 6. The apparatus as defined in Clause 1, wherein the predetermined constant anchor value is determined by a summation of the maximum calculable product exponent with a characteristic multiplicity factor dependent on a multiplicity of the more than two floating point values.

Clause 7. The apparatus as defined in Clause 6, wherein the characteristic multiplicity factor is determined as a ceiling value of a base-2 logarithm of the multiplicity of the more than two floating point values.

Clause 8. The apparatus as defined in Clause 6, when dependent on Clause 4 or Clause 5, wherein the multiplicity of the more than two floating point values is given by a multiplicity of addends in the two-input dot product operation or the four-input dot product operation.

Clause 9. The apparatus as defined in Clause 7, wherein the summation further comprises an increment value.

Clause 10. The apparatus as defined in Clause 9, wherein the increment value is 1.

Clause 11. The apparatus as defined in Clause 3, or in any of Clauses 4-10 when dependent on Clause 3, wherein the floating point processing instruction further specifies a scaling factor and the determination of the shift value for the prior accumulation value further comprises subtracting the scaling factor from the predetermined constant anchor value.

Clause 12. The apparatus as defined in Clause 3, or in any of Clauses 4-11 when dependent on Clause 3, wherein the floating point processing instruction further specifies a scaling factor and the determination of the shift value for the prior accumulation value further comprises adding the scaling factor to the predetermined constant anchor value.

Clause 13. The apparatus as defined in Clause 3, or in any of Clauses 4-12 when dependent on Clause 3, wherein a direction of the shift of the significand for the prior accumulation value is determined by a sign of the shift value and wherein the shift of the significand for the more than two floating point values is a right shift.

Clause 14. The apparatus as defined in Clause 4, or in any of Clauses 6-13 when dependent on Clause 4, wherein a first floating point format of the prior accumulation value differs from a second floating point format for the input floating point operands in that the first floating point format encompasses all precise encodings of the second floating point format, and wherein the shift of the significand for the prior accumulation value is a right shift and the shift of the significand for others of the more than two floating point values is a right shift.

Clause 15. The apparatus as defined in Clause 14, wherein the first floating point format comprises 16 bits and the second floating point format comprises 8 bits.

Clause 16. A non-transitory computer-readable medium on which is stored computer-readable code for fabrication of the apparatus of any of Clauses 1-13.

Clause 17. A method of data processing comprising:
decoding a floating point processing instruction specifying a floating point processing operation;
generating control signals to trigger the floating point processing operation; and
performing the floating point processing operation in response to the control signals, the floating point processing operation comprising:
performing processing that yields more than two floating point values; and
performing, for each of the more than two floating point values:
a determination of a shift value for a significand of that floating point value by subtracting an exponent value for that floating point value from a predetermined constant anchor value, wherein the predetermined constant anchor value is determined based on a maximum calculable product exponent for a product of the more than two floating point operands; and
a shift of the significand by the shift value determined for that floating point value.

Clause 18. A system comprising:
the apparatus of any of Clauses 1-15, implemented in at least one packaged chip;
at least one system component; and
a board,
wherein the at least one packaged chip and the at least one system component are assembled on the board.

Clause 19. A chip-containing product comprising the system of Clause 18 assembled on a further board with at least one other product component.

In brief overall summary, apparatuses, methods, computer readable media, and systems are disclosed in which a floating point processing instruction is decoded to generate control signals to trigger a floating point processing operation. In response to the control signals, the floating point processing operation is performed, comprising: performing processing that yields more than two floating point values; and performing, for each of the more than two floating point values: a determination of a shift value for a significand of that floating point value by subtracting an exponent value for that floating point value from a predetermined constant anchor value; and a shift of the significand by the shift value determined for that floating point value.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
decoder circuitry responsive to a floating point processing instruction to generate control signals to trigger a floating point processing operation; and
processing circuitry responsive to the control signals to perform the floating point processing operation, the floating point processing operation comprising:
performing processing that yields more than two floating point values; and
performing, for each of the more than two floating point values:
a determination of a shift value for a significand of that floating point value by subtracting an exponent value for that floating point value from a predetermined constant anchor value, wherein the predetermined constant anchor value is determined based on a maximum calculable product exponent for a product of the more than two floating point operands; and
a shift of the significand by the shift value determined for that floating point value.

2. The apparatus as claimed in claim 1, wherein the floating point processing instruction is a dot product instruction and the floating point processing operation is a dot product operation.

3. The apparatus as claimed in claim 1, wherein the floating point processing operation comprises an accumulation and the floating point processing instruction identifies an accumulation source from which a prior accumulation value is to be retrieved and into which an accumulation result of the floating point processing operation is to be accumulated.

4. The apparatus as claimed in claim 3, wherein the dot product operation is a two-input dot product operation and the floating point processing instruction identifies two pairs of input floating point operands and the accumulation source.

5. The apparatus as claimed in claim 3, wherein the dot product operation is a four-input dot product operation and the floating point processing instruction identifies four pairs of input floating point operands and the accumulation source.

6. The apparatus as claimed in claim 1, wherein the predetermined constant anchor value is determined by a summation of the maximum calculable product exponent with a characteristic multiplicity factor dependent on a multiplicity of the more than two floating point values.

7. The apparatus as claimed in claim 6, wherein the characteristic multiplicity factor is determined as a ceiling value of a base-2 logarithm of the multiplicity of the more than two floating point values.

8. The apparatus as claimed in claim 6, wherein the dot product operation is a two-input or a four-input dot product operation and the floating point processing instruction identifies two pairs or four pairs of input floating point operands and the accumulation source, wherein the multiplicity of the more than two floating point values is given by a multiplicity of addends in the two-input dot product operation or the four-input dot product operation.

9. The apparatus as claimed in claim 7, wherein the summation further comprises an increment value.

10. The apparatus as claimed in claim 9, wherein the increment value is 1.

11. The apparatus as claimed in claim 3, wherein the floating point processing instruction further specifies a scaling factor and the determination of the shift value for the prior accumulation value further comprises subtracting the scaling factor from the predetermined constant anchor value.

12. The apparatus as claimed in claim 3, wherein the floating point processing instruction further specifies a scaling factor and the determination of the shift value for the prior accumulation value further comprises adding the scaling factor to the predetermined constant anchor value.

13. The apparatus as claimed in claim 3, wherein a direction of the shift of the significand for the prior accumulation value is determined by a sign of the shift value and wherein the shift of the significand for the more than two floating point values is a right shift.

14. The apparatus as claimed in claim 4, wherein a first floating point format of the prior accumulation value differs from a second floating point format for the input floating point operands in that the first floating point format encompasses all precise encodings of the second floating point format, and wherein the shift of the significand for the prior accumulation value is a right shift and the shift of the significand for others of the more than two floating point values is a right shift.

15. The apparatus as claimed in claim 14, wherein the first floating point format comprises 16 bits and the second floating point format comprises 8 bits.

16. A non-transitory computer-readable medium on which is stored computer-readable code for fabrication of the apparatus of claim 1.

17. A method of data processing comprising:
    decoding a floating point processing instruction specifying a floating point processing operation;
    generating control signals to trigger the floating point processing operation; and
    performing the floating point processing operation in response to the control signals, the floating point processing operation comprising:
        performing processing that yields more than two floating point values; and
        performing, for each of the more than two floating point values:
        a determination of a shift value for a significand of that floating point value by subtracting an exponent value for that floating point value from a predetermined constant anchor value, wherein the predetermined constant anchor value is determined based on a maximum calculable product exponent for a product of the more than two floating point operands; and
        a shift of the significand by the shift value determined for that floating point value.

18. A system comprising:
    the apparatus of claim 1, implemented in at least one packaged chip;
    at least one system component; and
    a board,
    wherein the at least one packaged chip and the at least one system component are assembled on the board.

19. A chip-containing product comprising the system of claim 18 assembled on a further board with at least one other product component.

* * * * *